UNITED STATES PATENT OFFICE.

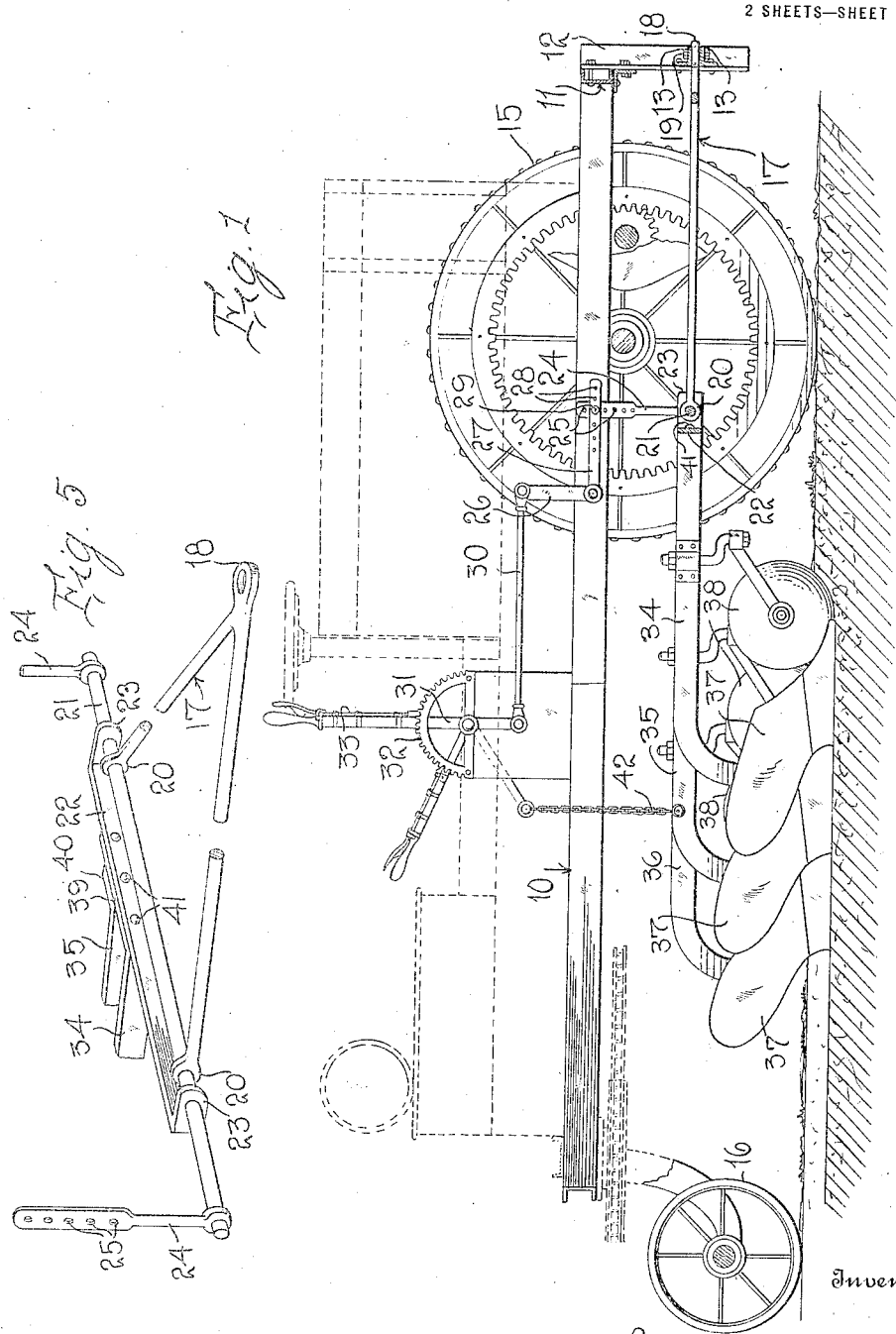

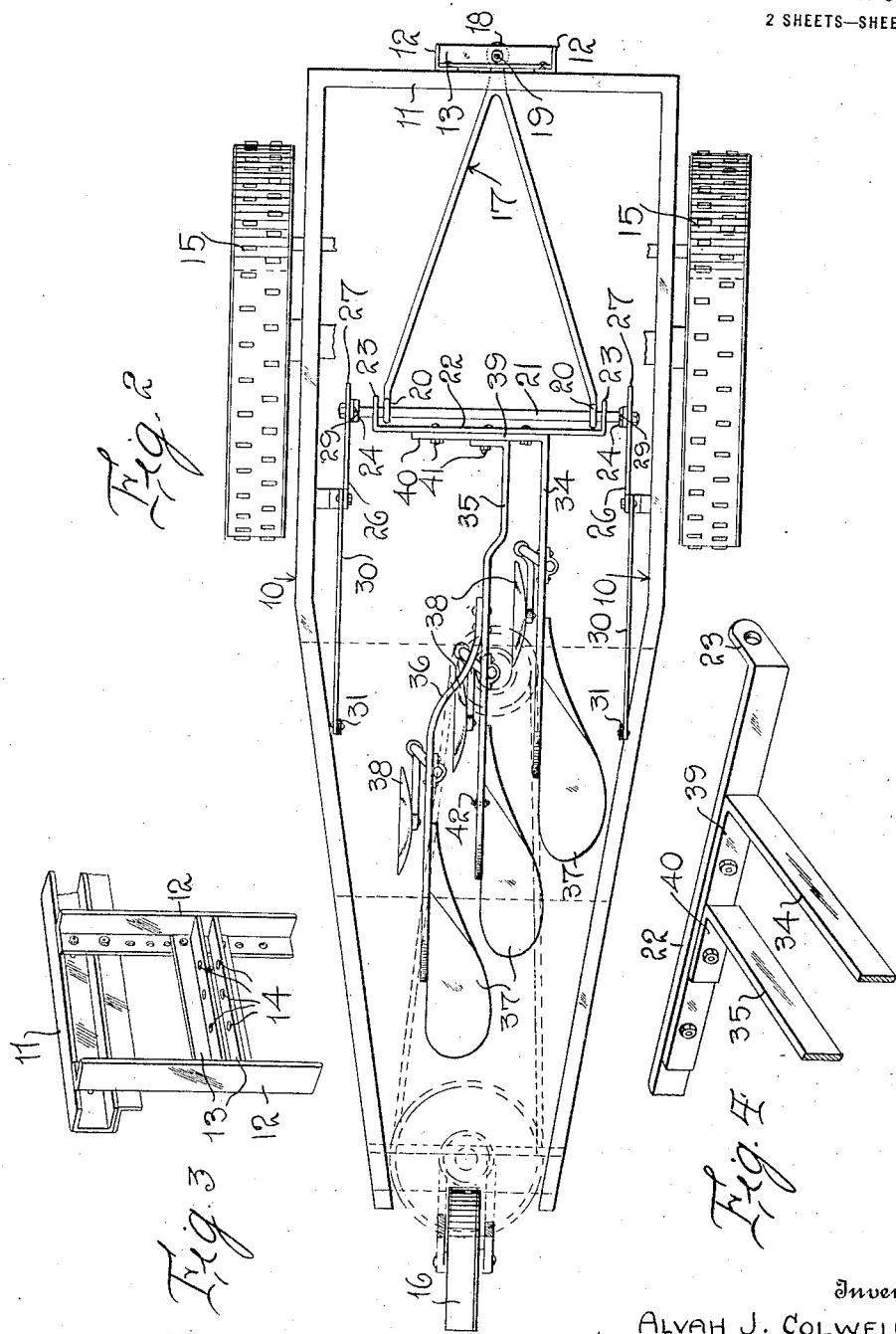

ALVAH J. COLWELL AND ALBERT T. KENNEY, OF NORFOLK, NEBRASKA.

DRAFT-HITCH FOR TRACTOR-VEHICLES.

1,329,581.        Specification of Letters Patent.      Patented Feb. 3, 1920.

Application filed September 25, 1916, Serial No. 122,039. Renewed September 16, 1919. Serial No. 324,220.

*To all whom it may concern:*

Be it known that we, ALVAH J. COLWELL and ALBERT T. KENNEY, citizens of the United States, residing at Norfolk, in the county of Madison and State of Nebraska, have invented certain new and useful Improvements in Draft-Hitches for Tractor-Vehicles, of which the following is a specification, reference being had to the accompanying drawings.

This invention relates to devices for connecting gangs of plows or other implements to tractor vehicles, and particularly to means for connecting plows to the tractor illustrated in our Patent No. 1,170,877, granted February 8, 1916.

The general object of our invention is the provision of an improved means for connecting gang plows to tractor vehicles, which will permit easy and quick adjustment of plows to the work and whereby the principle of the ordinary "walking plows" is applied to such use.

A further object of our invention is to provide means and provide a hitch which will permit the plows to be readily engaged with or disengaged from a tractor and which will also eliminate side draft friction.

Still another object is to provide means whereby the plows may be leveled or the plows adjusted quickly to secure uniform depth of furrow without having to move the tractor frame up and down to conform to changes in the ground level.

Other objects will appear in the course of the following description.

Our invention is illustrated in the accompanying drawings, wherein:

Figure 1 is a longitudinal sectional view of a tractor provided with our improved draft mechanism;

Fig. 2 is a top plan view of the construction shown in Fig. 1;

Fig. 3 is a perspective fragmentary detail view of the forward end of the tractor;

Fig. 4 is a perspective detail view of the yoke 22 and the forward ends of the plow beams; and Fig. 5 is a perspective detail view of the draw bar, yoke, leveling bar and hangers.

Referring to the drawings, it will be seen that the tractor illustrated includes a frame 10 composed of channel iron and including a front cross bar 11 also composed of channel iron. Rigidly attached to the front cross bar and extending downward therefrom are a pair of angle irons 12 having forwardly projecting flanges and laterally projecting base flanges. A pair of spaced angle irons 13 is bolted or otherwise attached to the angle irons 12 so that they may be vertically adjusted, the horizontal flanges of the spaced angle irons 13 being formed with a plurality of perforations 14. The forward end of the tractor frame 10 is supported upon the main traction wheels 15, while the rear end of the tractor is shown as supported upon a caster wheel 16. No driving mechanism or steering mechanism is illustrated as it is obvious that this forms no part of this invention. It will of course be understood that the tractor will be provided with suitable driving and steering mechanism, preferably such as that shown in Patent 1,170,877, before referred to.

The subject-matter of this present application is the means for connecting a gang of plows or other earth-working implements to the tractor illustrated, and this means includes an approximately V-shaped draw bar designated 17 which is formed at its forward end with an eye 18 which is adapted to be disposed between the angle irons 13 and engaged by a shackle pin or bolt 19. At its rear end the arms of the draw bar 17 are formed with the eyes 20 through which passes a transversely extending leveling bar or rod 21. This rod 21 also passes through the forwardly directed arms 23 of a yoke 22. Outward of the arms 23 the leveling bar is connected to depending hangers 24 whose upper portions are flattened and perforated as at 25. Mounted upon the frame of the tractor are the bell crank levers 26 which are vertically disposed and have the forwardly projecting arms 27 which are perforated as at 28. A bolt, pin or other connecting device 29 passes through one of the perforations of the arm 27 and through one of the perforations 25 of the corresponding hanger. The upwardly directed arm of each bell crank 26 is connected by means of a rod 30 to the lower end of an adjusting lever 31 which is mounted in any suitable manner upon the frame of the machine and operates over a toothed sector 32. As illustrated, this toothed sector forms a bracket for supporting the controlling lever. An ordinary latching mechanism, designated generally 33, is provided for engaging the teeth of the sector 32 and holding the lever 31 set in any adjusted position.

It will be seen that when both of the controlling levers 31 are adjusted in unison, both ends of the leveling bar will be raised or lowered to any degree required, and that by adjusting the levers differently from each other, one or the other end of the leveling bar may be adjusted upward or downward thus shifting the leveling bar out of parallel with the plane of the plane 10. It is obvious that the hangers may be shortened or lengthened by adjusting the hangers with relation to the forwardly extending arms 27, and that the hangers may be adjusted from front to rear with relation to these arms.

While we do not wish to limit ourselves to any particular ground working implement or implements, we have shown a plurality of beams 34, 35 and 36, these beams carrying plows 37 and cultivator wheels 38. The plow beam 36 is illustrated as attached to the plow beam 35. The plow beam 34 extends forward to the yoke 22 and is angularly bent as at 39. The forward end of the plow beam 35 is also angularly bent, as at 40, and bolts 41 pass through these angularly bent ends of the plow beams 34 and 35 so as to hold these plow beams rigidly attached to the yoke 22. The rear end of the gang of plows is operatively connected to a hoisting chain 42 which in turn may be connected in any suitable manner to the frame of the machine or may be connected to an operating lever whereby the rear end of the gang of plows may be raised or lowered so that the plows may be raised entirely from the ground.

It will be seen with this construction that the yoke 22 is pivotally connected to the leveling bar 21 so that the plows or other ground-working implements may "float" freely, thus considerably lightening the draft. It will be obvious that the depth of the work done by the implements, as for instance the plows 37 and the disks 38, may be regulated by raising or depressing the leveling bar and thus raising or depressing the forward ends of the plow beams. It will also be obvious that if the machine is traveling over uneven ground or on ground which is inclined laterally, the leveling bar may be controlled so as to dispose it in a horizontal plane though the plane of the machine is at an incline to the horizontal. By means of the leveling bar and the connections to the controlling levers 31, it is particularly easy to quickly adjust the plows or other implements to secure a uniform depth of furrow without moving the tractor frame up or down to conform to changes in the ground. The construction permits of easy and quick adjustment of the plows to the work and at the same time the plows or other implements attached to the tractor pull free, thus eliminating side draft friction. The plows may be readily attached to or detached from the yoke, and the draft mechanism may be also readily attached either to the plows or to the tractor. It will be obvious that after the plows are removed from connection with the yoke 22, the draft appliance may be readily raised so as to bring it out of the way of any obstruction over which the tractor may pass.

Attention is particularly called to the fact that the leveling bar or elevating mechanism includes links 24 which are pivotally connected to the transversely extending leveling bar or rod 21 and to the arms 27 of the bell crank lever 26. In our construction the point of application of the power to the gang of plows is at the apex of the triangular draw bar 17 and the power of the tractor is not applied elsewhere to the gang of plows. The draw bar 17 is capable of swinging laterally upon the pin 19 as well as tilting transversely. The draw bar and the plow beams are held from any independent lateral movement by their connection to the leveling rod 21 but the plow beams may be shifted in a vertical plane independently of the draw bar to regulate the depth of the cut of the plows. With this construction, when the tractor turns, the draw bar and the plow beams can swing laterally relative to the tractor, for the reason that the links 24 can swing forward and rearward and are sufficiently loose to permit slight lateral movement and a forward and rearward movement. Thus the plows do not move sidewise through the ground when the tractor moves to the right or to the left, but the plows track properly and swing with the draw bar relative to the tractor.

While we have shown certain details of construction which we have found to be particularly effective in practice, we wish it understood that it is within the scope of our invention to make minor changes and variations in the structure to suit varying conditions of use.

Having described the invention, what we claim is:

1. A hitch for vehicles comprising a draw bar having means whereby it may be connected to a vehicle, a leveling bar carried at the rear end of the draw bar, a yoke pivotally connected to the leveling bar, implement supporting beams rigidly connected to the yoke, and levers operatively connected to the leveling bar and adapted to independently vertically adjust either end of the leveling bar.

2. The combination with a vehicle including a frame, of vertically disposed bell crank levers mounted upon the vehicle, controlling levers operatively connected to the bell crank levers, hangers depending from the bell crank levers and pivoted thereto, a transversely extending leveling bar operatively carried by the hangers, a yoke pivotally mounted upon the leveling bar, a draw bar pivotally connected to the leveling bar and at its forward end detachably connected to the frame of the tractor, and beams adapted to support ground-working implements detachably connected to said yoke.

3. The combination with a vehicle including a frame, of bell crank levers mounted upon the frame for vertical movement, controlling levers operatively connected to the bell crank levers, hangers pivoted to the ends of the bell crank levers, a leveling bar supported by said hangers, a V-shaped draw bar having eyes through which the leveling bar passes, the forward end of the draw bar being detachably connected to the forward end of the vehicle frame, a yoke having forwardly turned ends through which the leveling bar rotatably passes and rearwardly extending implement supporting beams detachably connected to the yoke, and means for vertically adjusting the rear ends of said beams.

4. The combination with a vehicle including a supporting frame, of oppositely disposed bell cranks pivoted upon the supporting frame for vertical movement, each of said bell cranks having a forwardly projecting arm formed with a plurality of perforations, controlling levers mounted upon the frame operatively connected to the forwardly extending ends of the bell crank levers, hangers having their upper portions perforated and detachably connected to the forwardly extending arms of the bell crank levers, the lower ends of the hangers being formed with eyes, a transversely extending leveling bar supported in said eyes, a V-shaped draw bar through the rear end of which the leveling bar passes, the apex of the draw bar being formed with an eye, means for detachably connecting the eye of the draw bar with the forward end of the vehicle frame, a yoke having forwardly extending arms through which the leveling bar passes, implement supporting beams detachably connected to the yoke, and means for vertically adjusting the rear ends of said beams.

5. The combination with a vehicle having a supporting frame, the forward end of the supporting frame operatively supporting a pair of transversely extending spaced perforated members, of bell crank levers mounted upon the frame at each side, hangers depending from the bell crank levers, controlling levers mounted upon the frame and operatively connected to the bell crank levers, a leveling bar passing through the lower ends of the hangers, a draft bar operatively connected to the leveling bar and having its forward end disposed between said members and operatively connected thereto, a yoke mounted upon the leveling bar, and implement supporting beams operatively connected to the yoke.

6. A draft hitch for vehicles comprising a draw bar having means whereby it may be connected to the vehicle, said means permitting lateral tilting of the draw bar and lateral swinging movement in a horizontal plane, implement supporting beams rigidly connected to each other for common movement in all directions, means pivotally connecting the beams to the draw bar and permitting angular movement in a vertical plane of the beams relative to the draw bar, manually controlled means for raising or lowering the rear ends of the beams, and independently operable, manually controlled, vertically adjustable members pivotally connected to the draw bar and the beams, said members being free to shift longitudinally of the vehicle to permit the draw bar and the beams to swing laterally.

7. A draft hitch for vehicles comprising a draw bar having means whereby it may be connected to the vehicle and permitting lateral tilting movement of the draw bar and lateral swinging movement in a horizontal plane, implement supporting beams rigidly connected to each other for common movement in all directions, means pivotally connecting the beams to the draw bar permitting angular movement of the beams in a vertical plane, but holding the draw bar and beams from common lateral movement, manually controlled means for raising or lowering the rear ends of the beams but permitting the beams to swing laterally, and independently operable, manually controlled, vertically adjustable means pivotally connected to the draw bar and the beams and disposed one on each side of the longitudinal, middle plane of the hitch, said members being free to shift longitudinally of the vehicle to permit the draw bar and beams to swing laterally.

8. The combination with a vehicle including a wheeled frame having a downwardly extending member at its forward end, a draw bar loosely connected to the downwardly extending member and extending rearward therefrom, earth working implements disposed below the vehicle and forward of its rear end and having a plurality of beams rigidly connected to each other at their forward ends for common movement, operative draft connections between the draw bar and the beams, said connections permitting of vertical angular movement of the beams relative to the draw bar, means for raising or lowering the rear ends of the beams, and means for transversely tilting all of said implements as a whole relative to the vehicle frame or raising or lowering the forward ends of the beams as a whole relative to the vehicle frame.

9. A draft hitch for vehicles comprising a draw bar having rearwardly divergent arms, a yoke, implement supporting beams rigidly connected to the yoke for movement therewith, operative connections between the rear ends of the draw bar arms and the ends of the yoke, said connections pivotally connecting the yoke to the draw bar and permitting angular movement of the yoke and the supporting beams in a vertical plane, and levers operatively connected to each end of the yoke and adapted to independently vertically adjust either end of the yoke.

10. The combination with a vehicle, of a draw bar detachably connected to the forward end of the vehicle and having lateral tilting movement and lateral swinging movement around its point of connection, implement supporting beams rigidly connected to each other for common movement in all directions and operatively pivoted to the rear end of the draw bar for movement in a vertical plane, said beams being disposed entirely beneath the vehicle, manually controlled means on the vehicle and connected to the rear ends of the beams whereby the rear ends of the beams may be raised or lowered, and manually controlled, independently operable, vertically adjustable members mounted on the vehicle and pivotally connected to the rear end of the draw bar and the forward ends of the beams, said pivotal connection having the same axis as the pivotal end of the draw bar to the beams, said members having free movement longitudinally of the vehicle to permit the draw bar and the beams to swing laterally relative to the longitudinal medial plane of the vehicle.

11. The combination with a vehicle, of a draw bar operatively connected to the forward end of the vehicle for swinging movement in a horizontal plane and for transverse tilting movement, a transverse rod passing loosely through the rear end of the draw bar, a plurality of longitudinally extending implement supporting beams rigidly connected to each other and pivotally connected to the transverse rod for angular movement in a vertical plane, said transverse rod holding the beams against movement independent of the draw bar in a horizontal plane, means mounted on the vehicle for raising or lowering the rear ends of the beams, and manually controlled adjusting members mounted upon the vehicle at each side thereof for independently raising or lowering either end of the transversely extending rod and including links pivotally connected to the opposite ends of the rod and pivotally supported at their upper ends, said links having free swinging movement in vertical planes longitudinally of the vehicle.

12. The combination with a vehicle, of a draw bar operatively connected to the forward end of the vehicle for lateral swinging movement and for transverse tilting movement, a transversely extending bar passing loosely through the rear ends of the draw bar, a yoke extending parallel to the rod and having ears through which the rod loosely passes, implement supporting beams rigidly connected to each other and to said yoke, means on the vehicle for raising or lowering the rear ends of the implement supporting beams, adjusting members mounted upon the vehicle, and links connecting said adjusting members to the opposite ends of the transverse rod, said links having free swinging movement in vertical longitudinal planes, and the links being independently, vertically adjustable to raise or lower either end of the transverse rod.

In testimony whereof we hereunto affix our signatures in the presence of two witnesses.

ALVAH J. COLWELL.
ALBERT T. KENNEY.

Witnesses:
HAZEN L. ALBAUGH,
THOS. M. KURTZ.